US012576359B2

(12) United States Patent
Edge

(10) Patent No.: US 12,576,359 B2
(45) Date of Patent: Mar. 17, 2026

(54) AUTOMATED GAS SCRUBBER

(71) Applicant: KUSTOM KONCEPTS, INC.,
Midland, TX (US)

(72) Inventor: Eddie Edge, Midland, TX (US)

( * ) Notice: Subject to any disclaimer, the term of this
patent is extended or adjusted under 35
U.S.C. 154(b) by 310 days.

(21) Appl. No.: 17/893,096

(22) Filed: Aug. 22, 2022

(65) Prior Publication Data

US 2022/0395774 A1      Dec. 15, 2022

Related U.S. Application Data

(63) Continuation of application No. 15/611,208, filed on
Jun. 1, 2017, now Pat. No. 11,420,157.

(60) Provisional application No. 62/344,103, filed on Jun.
1, 2016.

(51) Int. Cl.
B01D 53/26      (2006.01)
B01D 45/08      (2006.01)
B01D 46/00      (2022.01)

(52) U.S. Cl.
CPC ........... B01D 53/266 (2013.01); B01D 45/08
(2013.01); B01D 46/0031 (2013.01); *B01D
2256/24* (2013.01)

(58) Field of Classification Search
CPC ......... B01D 53/26; B01D 45/08; B01D 46/00
See application file for complete search history.

(56) References Cited

U.S. PATENT DOCUMENTS 4,579,565 A * 4/1986 Heath ..................... E21B 43/34
96/201
7,854,849 B2 * 12/2010 Wang ..................... E21B 43/40
210/744

FOREIGN PATENT DOCUMENTS

CN        202937424 U  *  5/2013  .............. F04B 39/00

OTHER PUBLICATIONS

CN202937424U_English translation (Year: 2013).*

* cited by examiner

*Primary Examiner* — Youngsul Jeong
(74) *Attorney, Agent, or Firm* — Greenberg Traurig, LLP

(57)      ABSTRACT

An automated system for the separation of vapor and liquid
from a gas and liquid combination entering a separation
vessel. A programmable logic control unit module controls
a valve and is programmed for periodic release of separated
liquid collected within the vessel upon achieving various
conditions within the vessel or upon expiration of a pre-
established time interval, with separated liquid delivered via
an outlet port through a valve controlled by the program-
mable logic control unit to a storage tank.

10 Claims, 4 Drawing Sheets

AUTOMATED GAS SCRUBBER

PRIORITY

This application claims priority to U.S. provisional application No. 62/344,103, filed Jun. 1, 2016, the entirety of which is hereby incorporated by reference.

TECHNICAL FIELD

This disclosure relates generally to an apparatus for automated separation of the gas from a supply of a mixture of gas and liquid and particle contaminants. The automated separator system includes a gas scrubber having a separator and programmable logic controller that causes release of unwanted contaminants and liquids when certain user defined conditions are met. The gas separated from the mixture is directed to a flare stack or other source and the separated liquid and contaminant mixture is directed to a storage facility.

DESCRIPTION OF RELATED ART

Oil and gas exploration and drilling entails extraction of the resource from a subterranean formation as it flows to the earth's surface. The oil or natural gas is then collected at the well site. Often, unusable natural gas that contains primarily hydrocarbons, is also collected at drilling or testing sites. This natural gas commonly includes entrained water that is typically in the form of water vapor. Depending on the source, the natural gas may also include pollutants and other contaminants. Exploration entities must often dispose of the waste gas by burning it through a flare stack operated at the well site. The burning off of the waste gas is necessary as accumulation of the gas poses significant safety and environmental concerns.

The presence of natural gas with entrained water presents various problems common to the use, storage, transportation and further extraction of the gas. At cooler surface temperatures and decreased vapor pressure, the water vapor condenses into liquid. The presence of entrained water is undesirable and causes problems in pipeline and process equipment including corrosion. Collection areas in equipment and pipelines are common and at these places water collects and freezes into an ice, which is particularly problematic as drilling is common in places with cold climates. Frozen water in pipes results in partial or full restriction of gas flow through a line. In the gas exploration industry, therefore, various techniques have been employed to extract as much of the entrained water as possible from the natural gas or oil during extraction process.

One such process employed in the natural gas exploration industry to extract water from natural gas is through liquid dehydrators. Through this process, the natural gas including entrained water is directed into a vessel, often referred to as a scrubber. In the vessel, a separator is situated at a level above the point of entry of the liquid into the vessel. The separator retains the liquid present in the vapor as the wanted gas vapor (for further processing, transportation, or disposing by a flare) rises above the separator and is ultimately directed towards the target location. The "dry" natural gas can is then passed to a pipeline for storage or use.

At the same time, the byproduct of the separation process is a wet substance consisting primarily of water that is directed to a separate storage tank or facility for further processing or disposal. In the alternative, this remaining "liquid gas" may be re-introduced to the scrubber for additional extraction of vapor for burning or use.

The vapor and liquid components of the "wet" gas cannot simply be released into the environment or disposed of. The vapor component remaining after extraction of the entrained liquid is a pollutant that is usually burned off by a flare to minimize the negative effects of introducing the vapor to the environment. Similarly, the water remaining after the separation process is not "pure" water and invariably contains remnants of materials that impact negatively the environment. As such, the liquid remainder must be disposed of in tanks or other receptacles for removal or further processing. Enactment of environmental laws as the state and federal level require that the introduction of these pollutants to the atmosphere be minimized or eliminated altogether.

Following the process described above performed by the scrubber to separate the liquid and vapor of natural but perhaps unusable natural gas encountered during oil and gas extraction, the problem of monitoring and maintaining the scrubber in a safe manner persists. Operators of scrubbers must account for removing of the liquid residual after separation. They are limited, however, in terms of the frequency in which the scrubber vessel may be emptied and the size of the scrubber. As such, constant draining of the vessel is futile because separation is a relatively gradual process and none will occur if the scrubber acts as a virtual sieve. Similarly, the typical vessel holds a relatively small amount of liquid. For effective operation of the scrubber, the level of liquid within a lower chamber of the vessel should not rise to the level of the separation means. As such, a relatively small amount of liquid may be contained in the vessel. Operators are, therefore, required to empty the vessel at regular intervals to maintain effective separation by the scrubber.

Regular emptying of the scrubber vessel is also required to prevent overflow of the vessel that will cause flammable and environmentally hazardous liquid to spill on the ground. Moreover, preventing the entrained gas from permeating lines to a flare or other equipment is necessary to prevent damage to equipment or uncontrolled fire, for example, in or around other combustible materials or in areas in which a pilot or other ignition means exists. As a practical matter, scrubber vessels may be in use at remote locations where personnel may not be available to regularly remove or drain liquid from the vessel. Similarly, personnel that are present and responsible for maintaining the scrubber may be tasked elsewhere and scrubber emptying may be a low priority as compared to other tasks or forgotten. As such, scrubber vessels may overflow or be emptied in a hurried manner on the ground or sloppily causing spillage of the environmentally hazardous liquid. Perhaps worse, highly flammable liquid will permeate areas that if ignited may cause serious equipment damage or production or extraction delays or human injury or death.

The present inventions provides an automated vapor and liquid separator that eliminates the need for constant human intervention and monitoring to provide effective operation of the gas scrubber.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DESCRIPTION OF THE EMBODIMENTS

The following detailed description of the invention makes reference to the accompanying drawings, which form a part thereof and in which are shown, by way of illustration, exemplary embodiments in which the invention may be practiced. These exemplary embodiments are described in sufficient detail to enable those skilled in the art to practice the invention. It should, however, be understood that other embodiments may be realized and that various changes to the invention may be made without departing from the spirit and scope of the present invention. Therefore, the detailed description of the exemplary embodiments of the present invention that follows is not intended to limit the scope of the invention as it is claimed, but is presented for purposes of illustration only. The detailed description is intended to describe the features and characteristics of the present invention, and to sufficiently enable one skilled in the art to practice the invention. The scope of the present invention, therefore, is to be defined by the appended claims.

Figure 1:
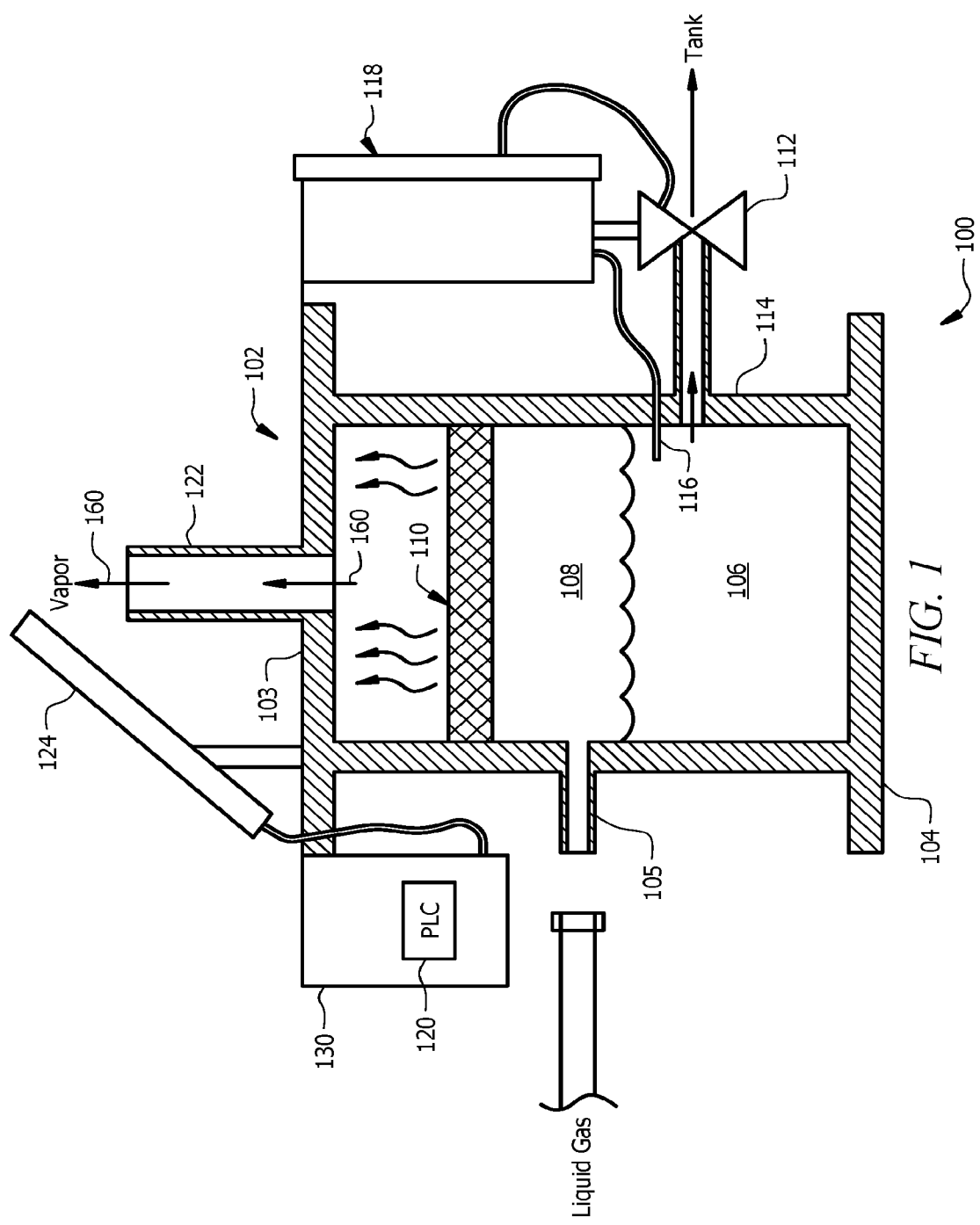
FIG. 1 is a diagram of an embodiment of the present automated vapor and liquid separator system.

One embodiment of the present automated vapor and liquid separator system is depicted in FIG. 1. In FIG. 1, the various components of automated vapor and liquid separator or scrubber 100 are shown. Scrubber 100 includes a vessel 102 in which the vapor and liquid separator components of scrubber 100 are housed. Vessel 102 is typically cylindrical in shape to provide optimal separation capability but vessel 102 may be formed of other shapes depending on a particular application. In one embodiment, vessel 102 is a closed vessel having a top side 103 and bottom side 104. Top side 103 and bottom side 104 are largely flat or planar surfaces, with bottom side 104 providing stability for vessel 102, which is commonly placed on an imperfect surface such as the ground.

Gas with entrained liquid enters vessel 102 though inlet port 105 and the liquid component ultimately exits vessel 102 through liquid outlet port 114. Within vessel 102 is a volume of liquid 106 that is a gas having entrained water and/or other liquids. Liquid 106 enters the vessel through inlet port 105 and reaches a particular level. As liquid 106 accumulates within vessel 102 a gap 108 is maintained between the surface of liquid 106 and separator material 110. Separator material 110 may be a series of baffles, a screen, mesh, foam, a sponge, a mist pad or other known separator material that provide a broad packing surface that grabs or captures waters from vapor that naturally emanates upward from liquid 106, through gap 108, through separator 110 and eventually exits vessel 102 though upper outlet port 122. Separator 110 may be constructed of any material suitable for capturing and collecting water from the vapor. The water or other liquid caught by separator 110 eventually drips back down through 108 into the pool of liquid 106 in the lower portion of vessel 106. Separator 110 is sized to fit tightly within the interior walls of vessel 102 to prevent vapor emanating from liquid 106 from exiting vessel 102 through upper outlet port 122 without passing through separator 110.

Liquid outlet port 114 is located below a point vertically along an interior side of vessel 102 that is considered an acceptable upper level of liquid 106.

Maintaining liquid at a safe level at the same time providing optimal performance of scrubber 100 is achieved through various automation components adapted to vessel 102 as now described. Liquid 106 exiting vessel 102 though liquid outlet port 114 encounters valve 112. Valve 112 may be a solenoid valve that is normally in a closed position and when an electromagnetic charge is introduced to the coils of the valve, the stopper or plunger is moved to an open position allowing liquid to flow through the valve and ultimately travel to a mobile or stationary storage tank or other processing facility (not shown). Once the charge is removed, the valve returns to the closed position. The electronics associated with valve 112 are housed in valve electronics housing 118. Housing 118 may include a power supply such as a battery charged by one or more connectively wired photoelectric panels 124 and associated electronics known in the art that covert sunlight into usable energy. Photoelectric panel 124 may be mounted to an upper side 103 of scrubber 100 with a suitable bracket or at a collocated area. Alternatively, valve 112 may be a manual pressure relief valve that comes to an open position upon exertion of a specified amount of force applied to an internal spring having a predetermined coefficient k.

In one embodiment, associated with valve 112 and its associated electronics is sensor 116. Sensor 116 may be a pressure sensing valve that measures pressure within vessel 102. Alternatively, sensor 116 may be a manual floating device that activates a switch residing in housing 118 upon liquid 106 within vessel 102 achieving a specified level. Or, sensor 116 may sense if the upper surface of liquid 106 reaches a particular height on an interior wall of vessel 102 and cause activation of a switch within housing 108 to cause current flow to solenoid valve 112. Other suitable sensing devices that measure other characteristics within vessel 102 may be applied.

In one embodiment, operation of the valve causing release of excess liquid 106 in vessel 102 of the automated scrubber 100 may be achieved through application of a programmable logic control (PLC) unit 120 coupled to with scrubber 100. To protect the PLC unit from the elements, PLC unit 120 may be housed within PLC housing 130 along with other electronics, including a power supply such as a battery that may be charged by wired photoelectric panels 124. As known in the art, PLC unit 120 may include a processor or control unit, memory for data storage, program memory that may be coupled to a program module or a computer and an interface to input devices such as the aforementioned sensors and an interface to an output device, such as solenoid valve 112. In operation, the program module of PLC unit 120 may be specifically developed to automate scrubber 100 and includes programmable executable instructions to control operation of valve 112 according to certain conditions. As discussed, the PLC unit 120 module may include instructions that cause opening and closing of valve 112 that in turn causes release or removal of liquid 106 from vessel 102 through liquid outlet port 114 upon detection of a certain environment condition by sensor 116. Sensor 116 may measure pressure within vessel 106, the weight of liquid within vessel 102, the level of liquid 106 within vessel 102 or other conditions. The reaching of a predetermined level as measured by sensor 116 will result in a signal transmitted to the input of PLC that will further activate, for example, opening of valve 112 through transmission of a signal that will close a switch associated with valve 112 electronics.

In an alternate embodiment, the PLC unit 120 module may be programmed to cause release of liquid 106 through valve 112 at timed intervals. Depending on the anticipated volume of liquid gas entering vessel 102 via inlet port 105, release of liquid 106 at regular intervals regardless of liquid 106 level may be established. This is particularly advantageous at times when scrubber 100 is unmanned or not otherwise monitored. Operators of automated scrubber 100 may program PLC unit 120 module to provide two layers of protection by establishing timed intervals for releasing liquid 106 through valve 112 in addition to establishing threshold levels of pressure, liquid weight, liquid level within the vessel, etc. at which liquid is released through valve and delivered to the designated storage tank through a pipeline upon reaching the predefined threshold level. The PLC unit may be programmed in a variety of ways to provide advantageous control of the level of and disposal of waste liquid in vessel 102. The PLC unit 120 module may be reprogramed in the event of changing conditions causing different criteria for discharge of liquid from vessel 102. This provides operators with a dynamic and customizable system for advantageous removal of entrained water from gas and ultimate removal of the resulting separated water and vapor.

Figure 4:
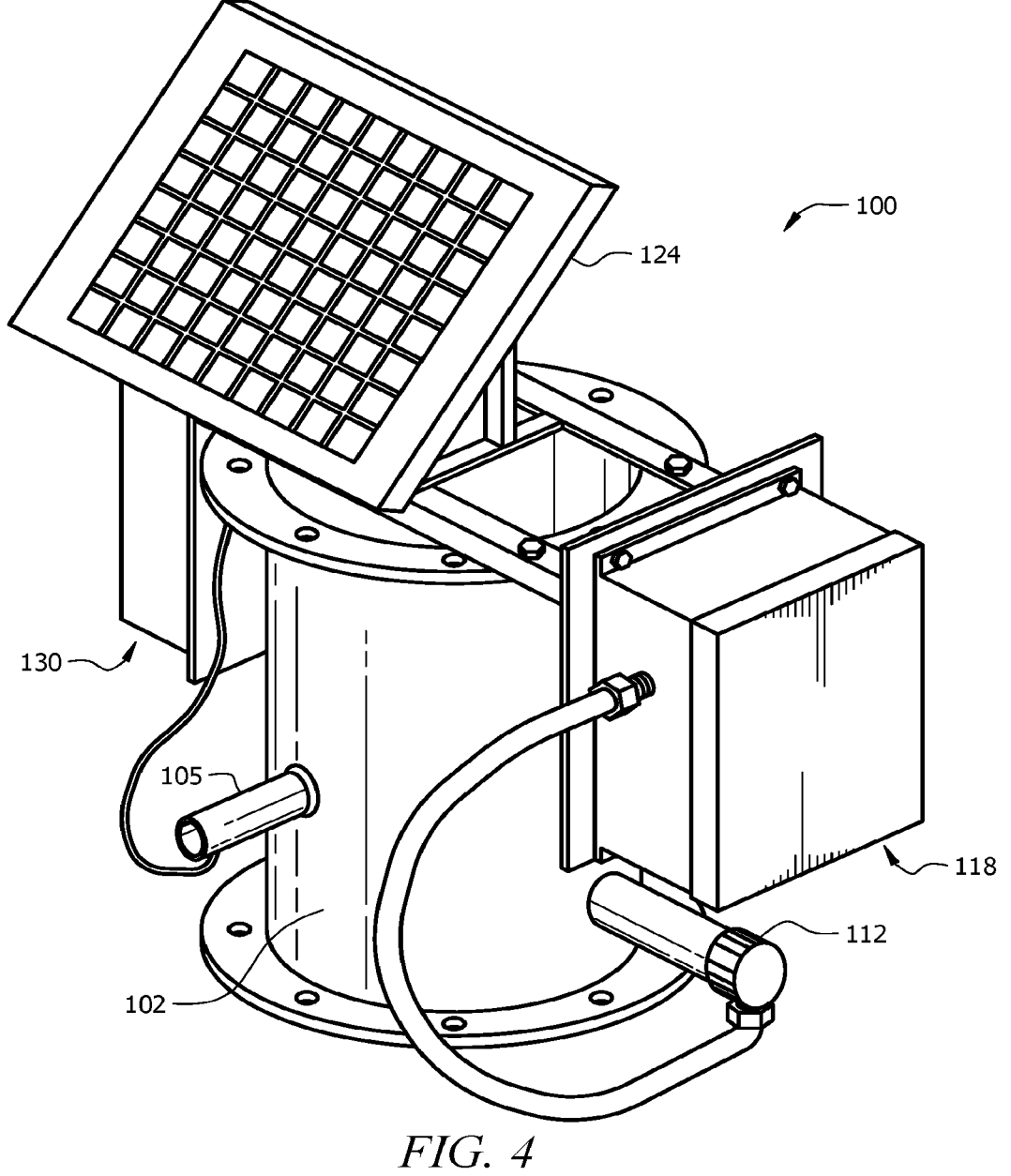
FIG. 4 is a perspective present automated vapor and liquid separator system.

Vapor 160 that exits separator 110 rises within vessel 102 above separator 110 and ultimately exits vessel 102 through upper outlet port 122. Upper outlet port 122 may be connected to a pipeline that leads vapor 160 to a burner or flare stack for burning in an environmentally acceptable manner. A pump (not shown) may be implemented and operated in conjunction with the opening of valve 112 to further facilitate removal of separated liquid from vessel 102. An alternate view of the presently described automated gas scrubber is provided as FIG. 4.

Figure 2:
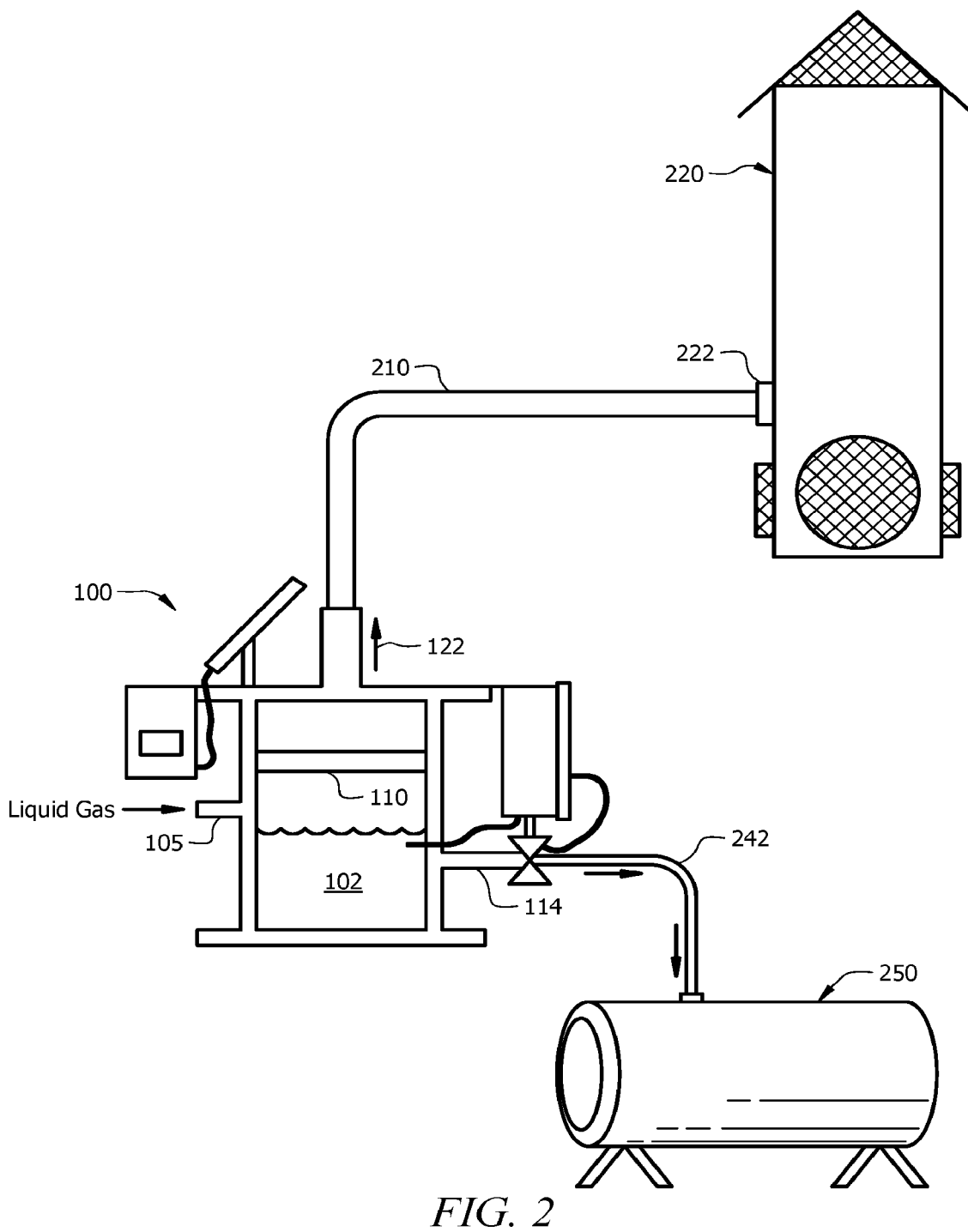
FIG. 2 is a diagram of an embodiment of a system eluding the present automated vapor and id separator system.

FIG. 2 depicts a system in which the automated liquid and gas separator 100 operates. As shown, automated liquid and gas separator 100 receives from a source gas having entrained water through an inlet port 105. Liquid from which vapor escapes within vessel 102 after passing through separator 110. Vapor rises above separator 110 and escapes vessel 102 through upper outlet port 122. A valve (not shown) may be connected to upper outlet port 122 if release of vapor needs to be temporarily halted or if closure of upper outlet port 122 is otherwise necessary. Exiting vapor travels through pipeline 210 to an inlet port 222 of flare stack 220. The vapor is fed to a fire tube and arrives at a flare situated at the top of flare stack 220 and is burned off in a manner acceptable according to environmental laws and regulations.

Liquid within vessel 102 that remains after separation of vapor by separator 110 may exit vessel 102 via liquid outlet port 114 through operation of valve 112 as described with respect to FIG. 1. Valve 112 may be controlled in a variety of ways via sensors and/or a PLC unit according to achievement of one or more conditions. Once accumulated liquid is collected, it travels through a pipeline 242 to a storage tank 250, where the liquid is housed until appropriately removed or further processed.

Figure 3:
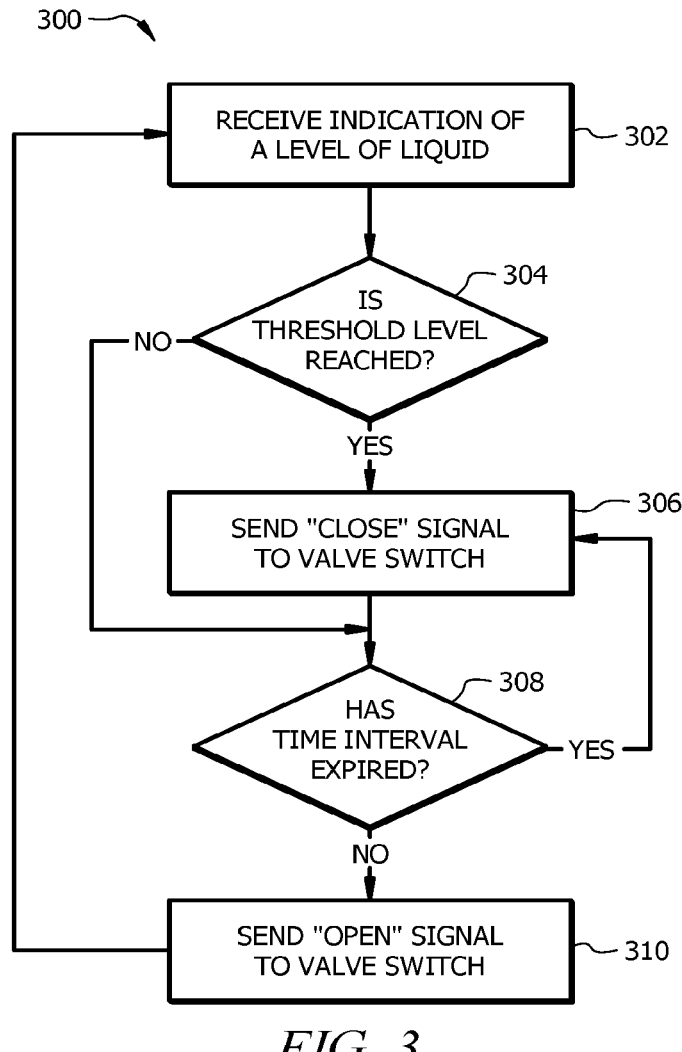
FIG. 3 is a flow diagram of a process performed by an embodiment of the present automated vapor and liquid separator system.

FIG. 3 is a flowchart depicting the process 300 of releasing unwanted liquid following separation of entrained water from a gas and liquid combination entering a scrubber according to an embodiment of the presently described automated gas scrubber. The process and methods described therein are performed through an appropriately programmed PLC unit 120 in communication with valve 112, such as a solenoid valve and associated electronics. The method of releasing separated liquid starts at step 302 where the PLC unit receives an indication from a state sensed by sensor 116 indicative of a level of liquid 106 in vessel 102 of automated gas and liquid separator 100. Upon receipt of the indication, the PLC unit queries at step 304 is whether a predefined level of liquid 106 in vessel 102 has been reached in order to invoke drainage of vessel 102. If the answer to the query is "yes", the method proceeds to step 306 where PLC unit sends a "close" signal to valve 112 for closure of a switch associated with valve 112, which causes valve 112 to be placed in an open position. The open position of valve 112 allows liquid 106 to be released through liquid outlet port 114 and ultimately delivered to a collocated storage tank. The system then proceeds to step 308, as described further below.

If, on the other hand, the answer to the query at step 304 is "no" then the process skips to step 308 where the PLC unit queries whether a preset time interval for automatic release of liquid 106 through liquid outlet port 114 has elapsed? This time interval is preset for automatic release of liquid 106 accumulated in vessel 102 regardless of the level of the liquid. Timed opening of valve 112 for release of liquid may be for a duration sufficient to completely or partially drain liquid from vessel 102. If the answer to query 308 is "yes", then the process reverts to step 306 and a "close" indication is sent to the valve switch, causing valve 112 to be placed in an open position as described. If the answer to query 308 is "no" then the method proceeds to step 110 and an "open" indication is sent to a switch associated with valve 112 and valve 112 remains in a closed position, allowing no liquid to escape vessel 102. Next, the method reverts to step 302 where the PLC unit again receives liquid level information sensed by a sensor 116, and the method repeats accordingly. The method and process described herein are executed through the described PLC unit 120 and associated programming capability, such as a program module or associated computer.

In operation, gas with entrained liquid from a source enters a vessel of the presently described automated gas scrubber system through an inlet port. Liquid accumulates at the bottom of a vessel of the gas scrubber and rises to a level where the environmental condition of the liquid is sensed by a sensor. Vapor contained in the liquid within the vessel rises and passes through a separator situated at an upper end of the vessel. The separator captures entrained liquid (primarily water) contained in the vapor and returns the liquid to the lower portion of the vessel with remaining liquid. The vapor with entrained water removed rises above the separator and escapes the vessel through an upper outlet port and ultimately travels through a pipeline to an external flare stack for environmentally acceptable burning. The liquid removed from the vapor and entering the vessel accumulates and is released though a liquid outlet port located in a lower section of the vessel. Associated with the liquid outlet port is a valve, such as a solenoid valve, that is opened to release unwanted liquid to a storage tank via a pipeline upon a condition within the vessel or a preset time limit reaching a threshold value or expiring. The valve is controlled according to program instructions of a PLC unit. Once a desired amount of liquid is removed from the vessel, the valve is returned to the closed position. This prevents the vessel serving as a sieve with gas having entrained liquid passing to a burn source.

There are countless advantages to the system and method discussed herein. First, having an automatic scrubber ensures that the liquid will be properly maintained at the desired level. This will reduce environmental violations as well as offer an environmentally friendly solution for treating vapor streams. Second, many of these scrubbers are often located in remote locations. Having the scrubber automated saves time and money as an operator does not need to physically travel to a remote location to check and empty scrubber pots. Third, in some embodiments the level of the scrubber is monitored at a remote location. This ensures safety and environmental compliance as one or more scrubbers can be monitored in real-time. Fourth, as noted, in some embodiments the scrubber can operate on batteries, solar power, wind power, and virtually any power source. This allows the scrubbers to be placed in remote locations which may not otherwise have access to the power grid.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious various thereof is contemplated as falling within the spirit and scope of the disclosed inventions.

The invention claimed is:

1. A method, comprising:
   storing in a programmable logic controller module, a variety of predefined threshold criteria values of condition of a liquid within a separation vessel;
   storing in the programmable logic controller module a preset time interval for periodic release of the liquid from the separation vessel, wherein the preset time interval is preset for automatic release of liquid accumulated in the separation vessel, regardless of a level of the liquid in the separation vessel,
   wherein the programmable logic controller module is configured to receive power from a photovoltaic-driven power supply;
   receiving, from a sensor, a signal indicative of a selected predefined threshold criteria value of the condition of the liquid within the separation vessel;
   opening a valve in response to the received signal indicative of the selected predefined threshold criteria value of the condition of the liquid within the separation vessel if a threshold criteria value of the condition of the liquid within the separation vessel is exceeded; and
   closing the valve, via the photovoltaic-driven power supply, in response to receipt of a signal indicating that the preset time interval is unexpired.

2. The method of claim 1, further comprising activation of a pump contemporaneously with the opening of the valve for removal through an outlet port of the liquid separated from a gas and liquid combination.

3. The method of claim 1, wherein the programmable logic controller module comprised a non-volatile memory.

4. The method of claim 1, further comprising the step of re-opening the valve in response to receipt of a signal indicating that the preset time interval has expired.

5. A method comprising:
   determining a variety of predefined threshold of criteria values for condition of a liquid in a separation vessel in a programmable logic controller module;
   determining a preset time interval for periodic release of a liquid from the separation vessel based on the threshold criteria value, wherein the preset time interval is preset for automatic release of liquid accumulated in the separation vessel, regardless of a level of the liquid in the separation vessel,
   wherein the programmable logic controller module is configured to receive power from a photovoltaic-driven power supply;
   receiving, from a sensor, signal indicative of the determined predefined threshold criteria value of the condition of the liquid within the separation vessel;
   opening a valve in response to a calculated criteria value of the condition of the liquid within the separation vessel meeting the selected predefined threshold criteria value; and
   disposing of the liquid stored within the separation vessel during the determined preset time interval.

6. The method of claim 5, wherein the programmable logic controller module is configured to be programmed.

7. The method of claim 5, wherein the separation vessel comprises a separator selected from a group consisting of: a mesh, a screen, baffles, a sponge, and a mist pad.

8. The method of claim 5, wherein the predefined threshold of criteria value of the condition of the liquid within the separation vessel is selected from a group consisting of: a weight of liquid accumulated in the separation vessel, a water pressure measured within the separation vessel, a depth of liquid accumulated in the separation vessel, and expiration of the preset time interval between a first release of the liquid from the separation vessel and a second release of the liquid from the separation vessel.

9. The method of claim 5, wherein the predefined threshold of criteria value of the condition of the liquid within the separation vessel is expiration of the preset time interval between a first release of the liquid from the separation vessel and a second release of the liquid from the separation vessel.

10. The method of claim 5, wherein the programmable logic controller module comprises a program module capable of storing the determined predefined threshold of criteria value of the condition of the liquid within the separation vessel.

* * * * *